United States Patent [19]
Yoshida et al.

[11] Patent Number: 5,375,877
[45] Date of Patent: Dec. 27, 1994

[54] LATERAL COLLISION DETECTOR

[75] Inventors: Ryouichi Yoshida; Hiroaki Fujii; Takahiro Yamanishi; Tomoko Shimizu; Atsushi Tsuji; Nobuya Osada, all of Shiga, Japan

[73] Assignee: Takata Corporation, Tokyo, Japan

[21] Appl. No.: 138,253

[22] Filed: Oct. 20, 1993

[30] Foreign Application Priority Data

Nov. 4, 1992 [JP] Japan ................. 4-294956

[51] Int. Cl.⁵ .............. B60R 21/32; H01H 35/14
[52] U.S. Cl. .................... 280/735; 180/274; 200/61.44; 200/61.45 R
[58] Field of Search ............. 280/730 A, 735, 734, 280/730 R, 728 R; 180/274, 282; 200/61.44, 61.42, 61.45 R, 61.48, 61.53, 85 A

[56] References Cited

U.S. PATENT DOCUMENTS

| | | | |
|---|---|---|---|
| 2,462,656 | 2/1949 | McLendon | 200/61.44 |
| 3,443,658 | 5/1969 | Culp | 200/61.44 |
| 3,946,178 | 3/1976 | Eberle et al. | 200/85 A |
| 5,179,256 | 1/1993 | Haglund | 280/735 |
| 5,277,441 | 1/1994 | Sinnhuber | 280/730 A |

FOREIGN PATENT DOCUMENTS

| | | | |
|---|---|---|---|
| 2018135 | 1/1990 | Japan | 280/735 |
| 3276843 | 12/1991 | Japan | 280/730 A |
| 2243933 | 11/1991 | United Kingdom | 280/735 |

*Primary Examiner*—Brian L. Johnson
*Assistant Examiner*—Peter C. English
*Attorney, Agent, or Firm*—Kanesaka & Takeuchi

[57] ABSTRACT

A lateral collision detector is formed of a wire extended along the inner face of the outer plate of an automotive door; and a signal output device adapted to be pulled and actuated by the wire.

5 Claims, 7 Drawing Sheets

LATERAL COLLISION DETECTOR

BACKGROUND OF THE INVENTION

1. Field of the Invention

The present invention relates to a lateral collision detector for detecting a lateral collision of an automobile.

2. Description of the Related Art

In order to prevent an automobile occupant from being hit by a door at the time of a lateral collision, there is disposed in the door an air bag device. This lateral collision air bag device is started to extend its air bag when the vehicle has a lateral collision. In order to detect this lateral collision, the lateral acceleration of the vehicle is detected, and a diagnosis circuit decides the lateral collision when the detected acceleration exceeds a predetermined level, to supply a starting current to a gas generator of the air bag device.

Thus, a starter of the lateral collision air bag device of the prior art needs to have the acceleration sensor and the diagnosis circuit so that its structure is complicated to raise the production cost.

OBJECT AND SUMMARY OF THE INVENTION

An object of the present invention is to solve the above-specified problem of the prior art and to provide a lateral collision detector having a simple structure and a low production cost.

According to a first aspect of the present invention, there is provided a lateral collision detector comprising: a wire extending along the inner face of the outer plate of an automotive door; and signal output means to be pulled and actuated by the wire.

According to a second aspect, the lateral collision detector of the first aspect further comprises a bar member arranged along the inner face of the door outer plate and the wire extending along a side opposed to the door outer plate.

According to a third aspect, in the lateral collision detector of the second aspect the bar member is formed on a side opposed to the door outer plate with a plurality of slits which awe extended across the longitudinal direction of the bar member and arranged at a predetermined interval in the longitudinal direction.

According to a fourth aspect, there is provided a lateral collision detector comprising: a water-tight bag disposed in a door of an automobile; a liquid filled in the bag; a hollow member rising from the liquid level of the bag; and an actuation switch adapted to be actuated by the contact with the liquid coming into the hollow member.

According to the first aspect, the door of an automobile having the lateral collision detector has its outer plate depressed into the cabin when the automobile has a lateral collision. The wire is pulled by the depression to actuate the signal output means.

According to the second aspect, the bar member is deformed following the depression of the door outer plate. The amount of deformation of the face of the bar member along the outer plate in this case is substantially equal to that of the door outer plate, but the amount of deformation of the bar member along the face opposed to the outer plate is far larger. This makes it possible to detect the lateral collision earlier.

According to the third aspect, the bar member is slitted so that it becomes more liable to deform following the deformation of the door outer plate.

According to the fourth aspect, when the door is depressed by a lateral collision, if any, the bag is pushed and squeezed to bring its liquid into the hollow member. Then, the liquid comes into contact with the actuation switch so that the switch is actuated to detect the lateral collision.

DESCRIPTION OF THE PREFERRED EMBODIMENTS

The present invention will be described in the following in connection with its embodiments with reference to FIGS. 1 to 7.

This door 10 is equipped with an outer plate 12 and an inner plate 14, which has its inner face trimmed, as at 16. Numeral 18 designates a front pillar, and numeral 20 designates a center pillar.

Figure 1:
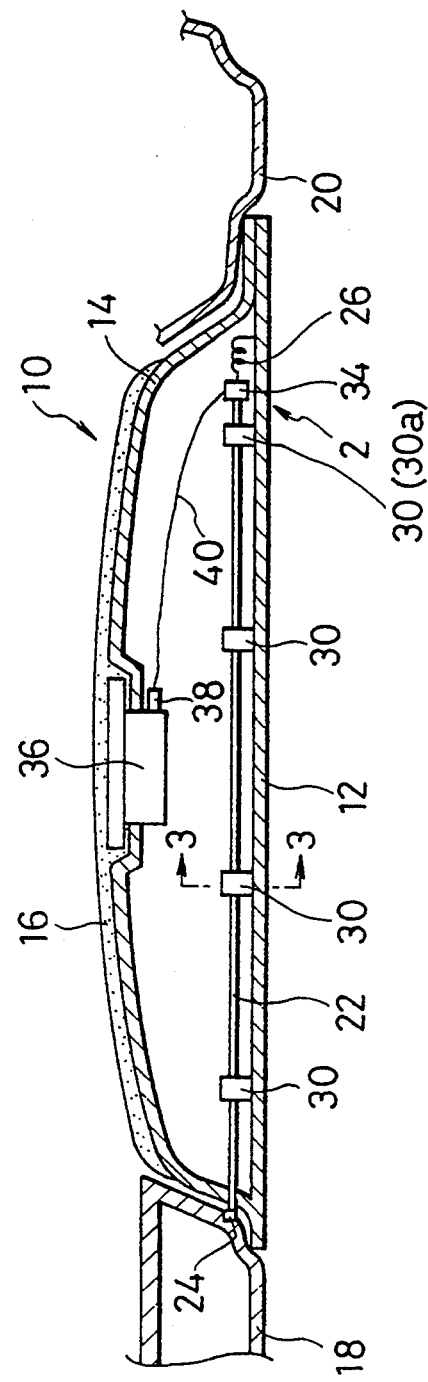
FIG. 1 is a horizontal sectional view taken along a line 1—1 of FIG. 5 showing a door equipped with a lateral collision detector according to an embodiment of the present invention.
Figure 2:
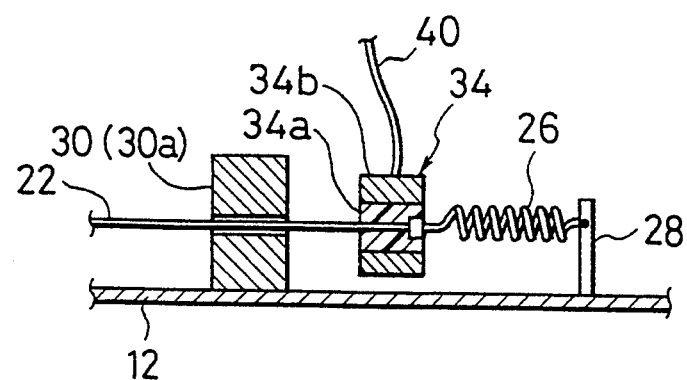
FIG. 2 is an enlarged view showing a portion 2 of FIG. 1.

Along the inner face of the outer plate 12, there is tensed a wire 22. This wire 22 has its one end extending outside of the door 10 and fixed in the front pillar 18 at its wire fixing end 24. The other end of the wire 22 is connected to a coil spring 26, which in turn is connected to a bracket 28 (as shown in FIG. 2). This bracket 28 is fixed on the outer plate 12.

Figure 3:
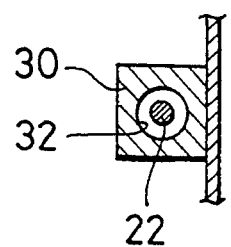
FIG. 3 is a sectional view taken along the line 3—3 of FIG. 1.

As better seen from FIG. 3, there are fixed on the inner face of the outer plate 12 a plurality of wire guides 30 each having a through hole 32, through which is threaded the wire 22. This wire 22 is equipped at its rear end with a contact member 34, which has its central portion made of an insulating material 34a such as a synthetic resin and its outer circumference made of a tip 34b of a conductive material such as copper, as shown in FIG. 2. This conductive tip 34b is positioned to contact with the rearmost one 30a of the wire guides 30. The rearmost wire guide 30a is made of a conductive material such as copper and is welded or soldered to the outer plate 12.

On the inner plate 14, there is mounted an air bag device 36, which has its ignition plug 38 connected with the conductive tip 34b of the contact member 34 through a lead line 40.

Figure 4:
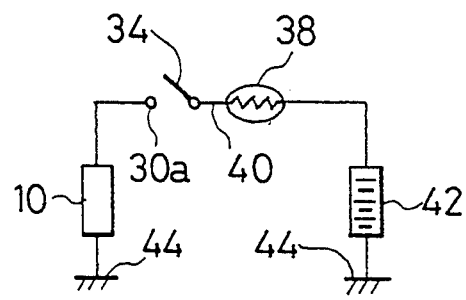
FIG. 4 is a schematic circuit diagram showing the lateral collision detector.
Figure 5:
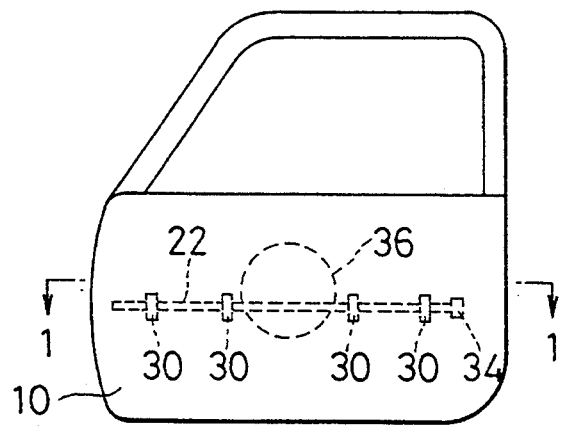
FIG. 5 is a front elevation showing the door of FIG. 1.

Turning to FIG. 4, the ignition plug 38 has its one terminal connected with the anode of a battery 42 of an automobile, and this battery 42 has its cathode connected with a body frame 44. This body frame 44 has conduction with the wire guide 30a through the door 10.

Figure 6:
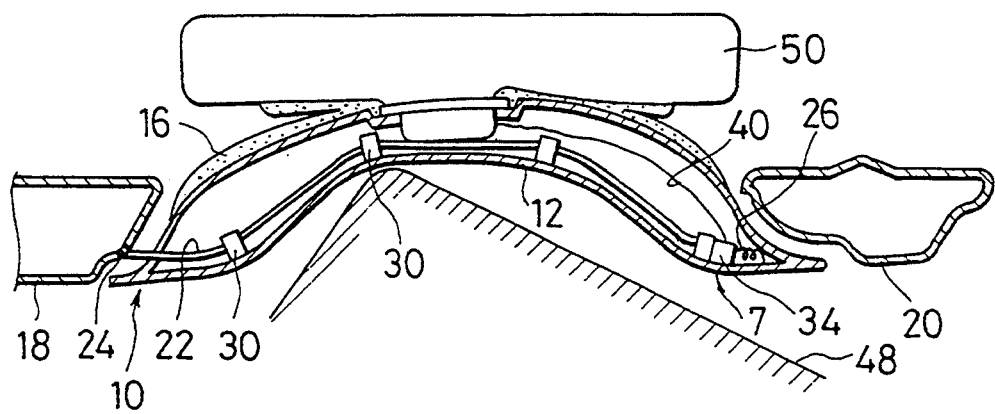
FIG. 6 is a horizontal sectional view showing the door of FIG. 1 at the time of a lateral collision.
Figure 7:
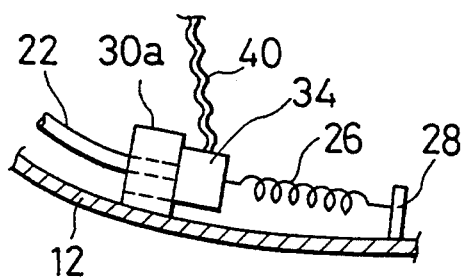
FIG. 7 is an enlarged view showing a portion 7 of FIG. 6.

When the door 10 having the lateral collision detector thus constructed is laterally hit by a vehicle 48, as shown in FIG. 6, the door 10 has its outer plate 12 depressed into the cabin. Then, the wire 22 is pulled to bring the tip 34i b of the contact member 34 into contact with the wire guide 30a, as shown in FIG. 7. Then, the ignition plug 38 is energized by the battery 42 to start the inflater of the air bag device 36 thereby to generate the gas. As a result, the air bag 50 is extended into the cabin to protect the occupant, as shown in FIG. 6. Here, the trimming 16 is torn by the air bag 50 being extended.

Thus, according to this lateral collision detector, the air bag device 36 can dispense with any acceleration sensor or acceleration diagnosis circuit so that the lateral collision can be reliably detected by a device having a simple structure.

Figure 8:
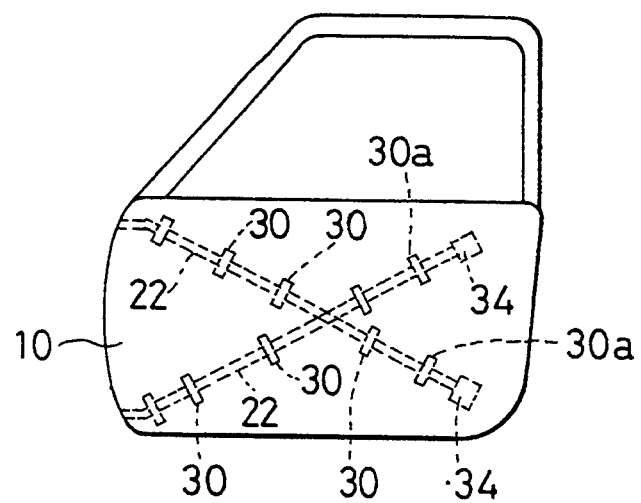
FIG. 8 is a front elevation showing a door equipped with a detector having two wires.
Figure 9:
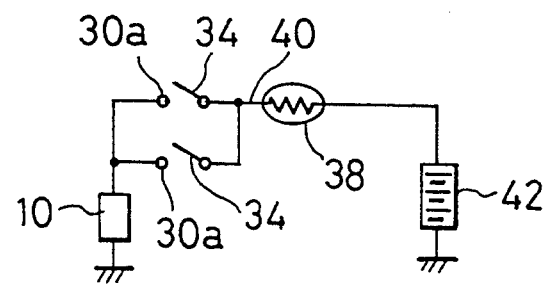
FIG. 9 is a schematic circuit diagram showing the lateral collision detector of FIG. 8.

Only one wire 22 is extended longitudinally of the automobile in the embodiment described above, but a plurality of wires may be employed in the present invention. Moreover, that wire need not be arranged horizontally but may be arranged vertically or obliquely, as exemplified in FIG. 8. As shown, two wires 22 are so obliquely extended as to cross midway and are individually equipped at their rear ends with contact members 34. In case a lateral collision is to be detected by those two contact members 34, these contact members 34 may preferably be connected in parallel with the ignition plug 38 and the battery 42, as shown in FIG. 9. Then, the air bag device 36 can be started if either one of the contact members 34 comes into contact with the corresponding wire guide 30a.

Figure 10:
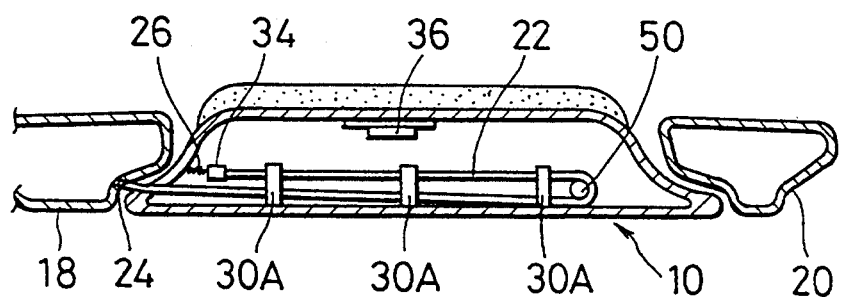
FIG. 10 is a horizontal sectional view showing a door equipped with a lateral collision detector having a folded wire.

In the present invention, on the other hand, the wire 22 may be folded back at a pulley 50, as shown in FIG. 10. If the wire 22 is once folded back, as shown in FIG. 10, the contact member 34 can have its moving stroke doubled relative to the identical deformation of the outer plate 12. The wire 22 is folded on the pulley 50 in FIG. 10 but may be hooked by a low fraction hook member rather than the pulley. Moreover, the wire 22 is once folded back in FIG. 10 but may be folded back zigzag by two or more times. Here, the wire guides 30A are individually formed with two through holes, through which the folded two wires 22 are individually threaded.

Figure 11:
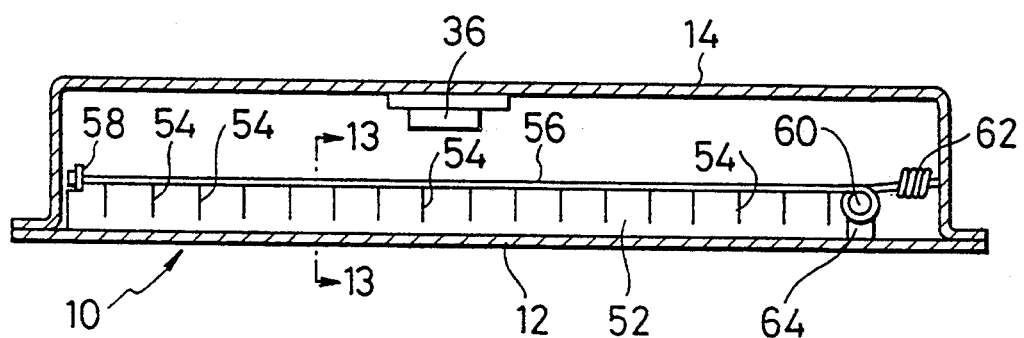
FIG. 11 is a horizontal sectional view showing a door equipped with a lateral collision detector according to another embodiment.
Figure 12:
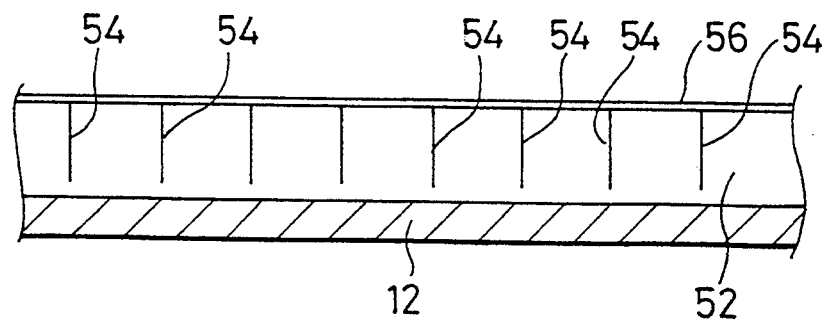
FIG. 12 is an enlarged view showing an essential portion of FIG. 11.
Figure 13:
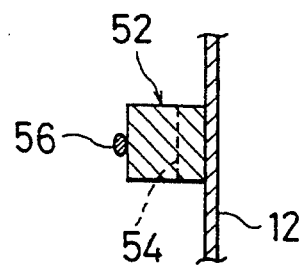
FIG. 13 is a sectional view taken along the line 13—13 of FIG. 11.
Figure 14:
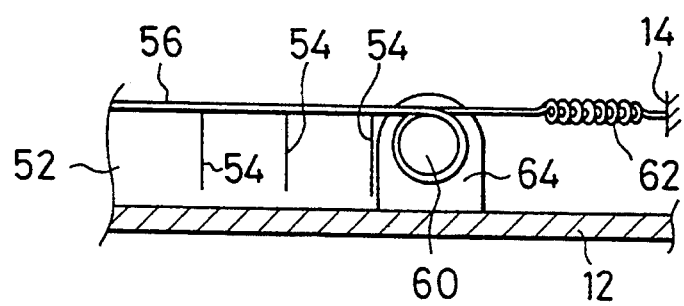
FIG. 14 is an enlarged view showing a dynamo portion of FIG. 11.

FIG. 11 is a horizontal sectional view showing a door equipped with a lateral collision detector according to another embodiment of the present invention. FIG. 12 is an enlarged view showing an essential portion of the lateral collision detector; FIG. 13 is a sectional view taken along the line 13—13 of FIG. 11; FIG. 14 is an enlarged view showing a signal generating portion of the lateral collision detector; and FIG. 15 is a diagram for explaining the operation at the time of a lateral collision.

Along the inner face of the outer plate 12, there is fixed a sensor base 52 which is made of a bar. This sensor base 52 is formed into a square column and is slitted at 54 in its face opposed to the outer plate 12. A number of these slits 54 are arranged longitudinally of the sensor base 52 at a predetermined interval and extended across the longitudinal direction of the sensor base 52. A wire 56 is extended along the face of the sensor base 52 opposed to the outer plate 12. This wire 56 has its leading end fixed in the sensor base 52 by its wire fixing member 58. The rear end of the wire 56 is wound on a pulley 60 and then connected to one end of a coil spring 62, the other end of which is fixed on the inner plate 14.

The pulley 60 is fixed to the spindle of a dynamo 64 for outputting a voltage when the pulley 60 is turned.

Figure 15:
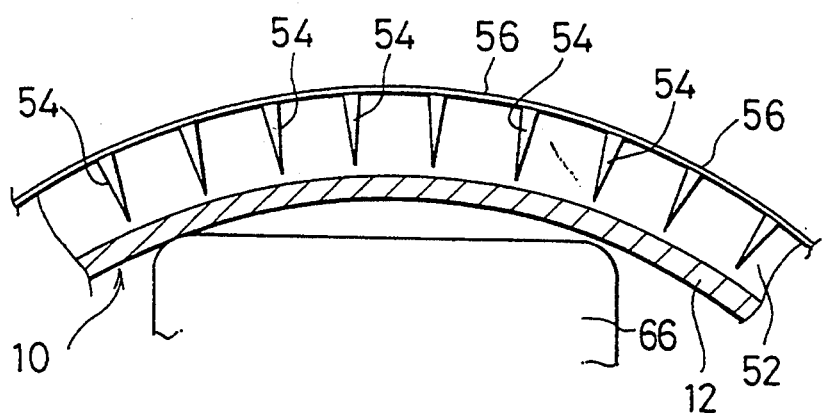
FIG. 15 is an enlarged view showing an essential portion at the time of a lateral collision of the door of FIG. 11.

When the door 10 equipped with the lateral collision detector thus constructed is laterally hit by a vehicle 66, as shown in FIG. 15, its outer plate 12 is depressed into the cabin so that the sensor base 52 is accordingly deformed to have its inner face elongated. Then, the wire 56 is pulled to elongate the coil spring 62 so that the pulley 60 is turned counterclockwise, as shown in FIGS. 11 and 14. According to this turning motion of the pulley 60, the dynamo 64 outputs the voltage to energize the air bag device 36. Incidentally, the dynamo 64 may be replaced by a signal output device such as a potentiometer or a rotary encoder.

The present embodiment can also dispense with the acceleration sensor or the diagnosis circuit so that it can detect a lateral collision reliably with a simple structure. Incidentally, the side of the sensor base 52 opposed to the outer plate 12 can be laterally largely extended, as shown in FIG. 15, to detect the lateral collision reliably.

Figure 16:
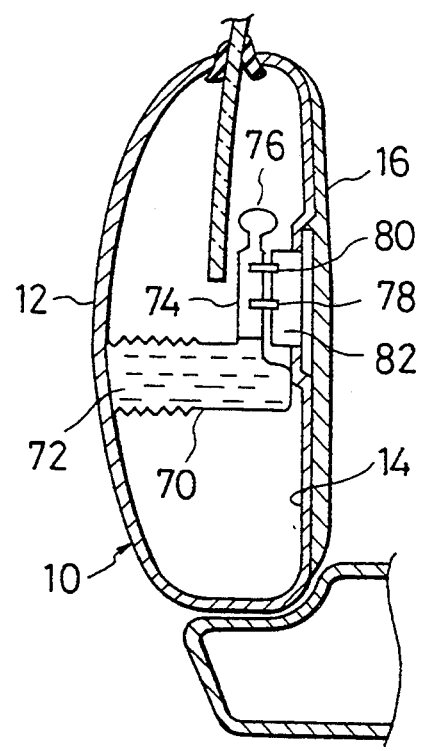
FIG. 16 is a longitudinal section showing a door equipped with a device of still another embodiment.
Figure 17:
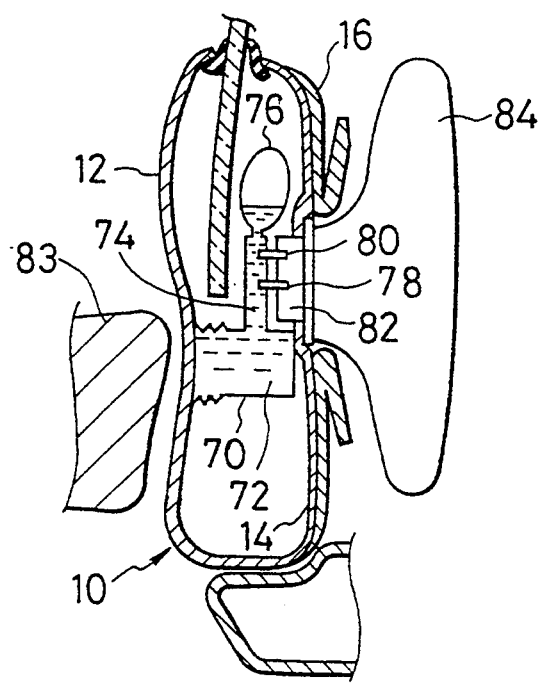
FIG. 17 is a longitudinal section at the time of a lateral collision of the door of FIG. 16.

FIG. 16 is a longitudinal section showing a door equipped with a lateral collision detector according to still another embodiment of the present invention, and FIG. 17 is a diagram for explaining the operation in case the door is laterally hit by a vehicle.

In the space enclosed by the outer plate 12 and the inner plate 14, there is disposed a water-tight bag 70 which is charged with a conductive liquid 72. The bag 70 has a portion raised to form a rising portion 74 which is formed with an extendible bag 76 at its upper portion. The rising portion 74 is equipped therein with two electrodes 78 and 80. When the door 10 is not deformed, as shown in FIG. 16, the bag 70 is so charged with the conductive liquid 72 that the rising portion 74 is wetted at its lower end portion with the conductive liquid 72.

When this door 10 is laterally hit by a vehicle 83, the outer plate 12 is depressed into the cabin. Then, the bag 70 is pushed and deformed by the outer plate 12 to have its capacity reduced so that the conductive liquid 72 is squeezed to enter the rising portion 74 and come into contact with both the electrodes 78 and 80. As a result, these electrodes 78 and 80 are connected to energize the ignition plug of an air bag device 82 so that the air bag device 82 is actuated to extend its air bag 84 into the cabin. At this time, the inner trimming 16 is torn by the air bag 84 being extended. As the conductive liquid 72 enters to rise in the rising portion 74, the gas having occupied the rising portion till then enter into the extendible bag 76 while inflating it.

According to the lateral collision detector as shown in FIGS. 16 and 17, too, the lateral collision can be reliably detected by a simple structure.

As has been described hereinbefore, according to the lateral collision detector of the present invention, the lateral collision can be reliably detected by a simple structure.

What is claimed is:

1. A lateral collision detector comprising,
   a plurality of guide members mounted on an inner surface of an outer plate of an automobile door and having holes therein,
   a wire threaded through the respective holes of the guide members and extending along the inner surface of the outer plate,
   a spring connecting at least one end of the wire to the door so that the spring is extended by the wire pulled when the door has a lateral collision, and
   signal output means actuated by the wire and having a tip made of a conductive material fixed to one end of the wire through an insulating material, one of said guide members situated closest to said tip being made of a conductive material and fixed to the outer plate so that when the door has a lateral collision, the tip is pulled to contact the closest guide member to thereby detect the lateral collision.

2. A lateral collision detector according to claim 1, wherein said tip is connected with an air bag device through a lead line.

3. A lateral collision detector according to claim 2, further comprising an additional a plurality of second guide members mounted on the inner surface of the outer plate and having second holes therein; a second wire threaded through the respective second holes and extending along the inner surface of the outer plate; a second spring connecting one end of the second wire to the door; and second signal output means actuated by the second wire and having a second tip made of a conductive material fixed to one end of the second wire through an insulating material, one of said second guide members situated closest to said second tip being made of a conductive material and fixed to the outer plate so that when the door has a lateral collision, the second tip is pulled to contact the closest second guide member, said second tip being connected to the air bag device in parallel with said tip.

4. A lateral collision detector according to claim 1, wherein said tip is mounted on the wire near the spring, and the wire at an end opposite to the spring is fixed to an automobile.

5. A lateral collision detector according to claim 1, wherein said guide members include additional holes therein, said wire threaded through the holes turning a direction backwardly and passing through the additional holes to provide a long moving stroke for the tip.

* * * * *